United States Patent [19]

Crawford

[11] 4,096,022

[45] Jun. 20, 1978

[54] TAPE DISPENSER AND APPLICATOR

[76] Inventor: Harry J. Crawford, 22955 Glenmoor Heights Dr., Farmington, Mich. 48024

[21] Appl. No.: 794,408

[22] Filed: May 6, 1977

Related U.S. Application Data

[63] Continuation-in-part of Ser. No. 666,869, Mar. 15, 1976, Pat. No. 4,026,757.

[51] Int. Cl.[2] .......................... B32B 31/20; B32B 35/00

[52] U.S. Cl. .......................... 156/577; 156/579; 156/584; 225/51

[58] Field of Search .............. 156/574, 575, 577, 579, 156/584, 523, 524, 526, 527, 494; 225/26, 51

[56] References Cited

U.S. PATENT DOCUMENTS

| | | | |
|---|---|---|---|
| 602,948 | 4/1898 | Kunkle | 156/494 |
| 2,783,878 | 3/1957 | Traver | 225/51 |
| 3,274,038 | 9/1966 | Karn | 156/584 X |
| 3,707,426 | 12/1972 | Robison | 156/527 |
| 3,740,299 | 6/1973 | Schroter et al. | 156/584 X |

*Primary Examiner*—David Klein
*Assistant Examiner*—M. G. Wityshyn
*Attorney, Agent, or Firm*—Robert G. Mentag

[57] ABSTRACT

A tape dispenser for applying paper lined electrically conductive pressure sensitive adhesive tape or foil on a flat surface for forming a part of an electrical alarm system. The dispenser includes a housing having a tape storage chamber in which is rotatably mounted a roll of paper lined pressure sensitive adhesive foil. The housing has an extension on the front side thereof through which the tape is dispensed. A pressure member is mounted on the housing extension over the point at which the tape is discharged from the housing extension, for use in pressing the tape on a flat surface as it is discharged from the dispenser. The dispenser includes means for stripping the paper liner from the foil as the foil is fed from the roll in the dispenser.

5 Claims, 3 Drawing Figures

FIG. 1
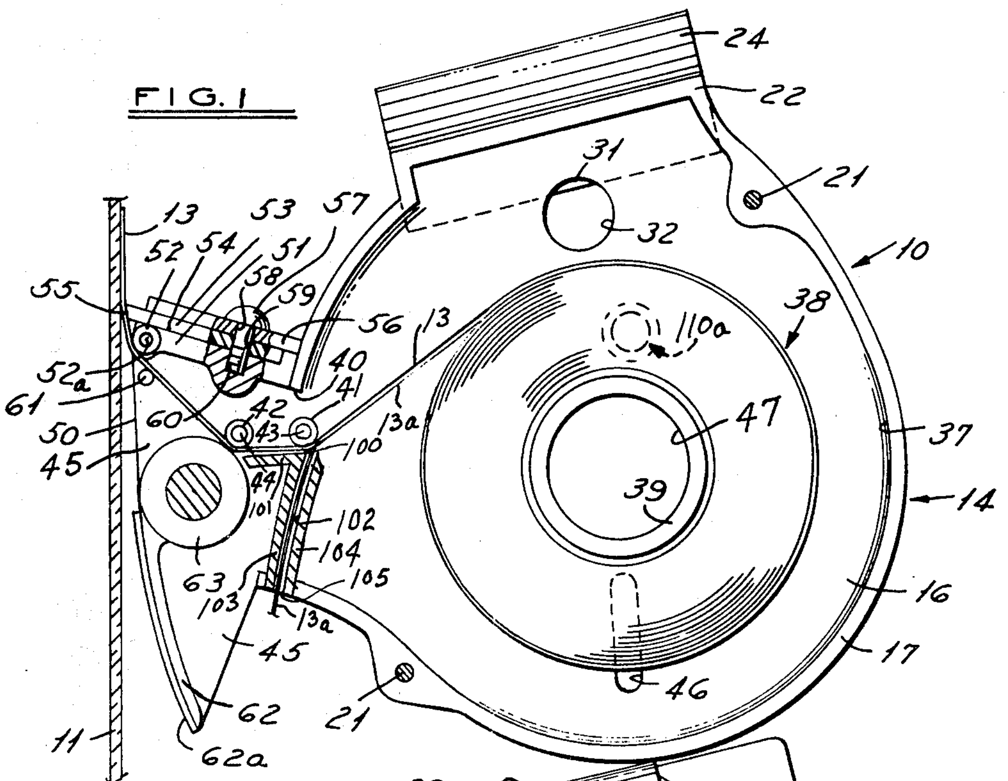
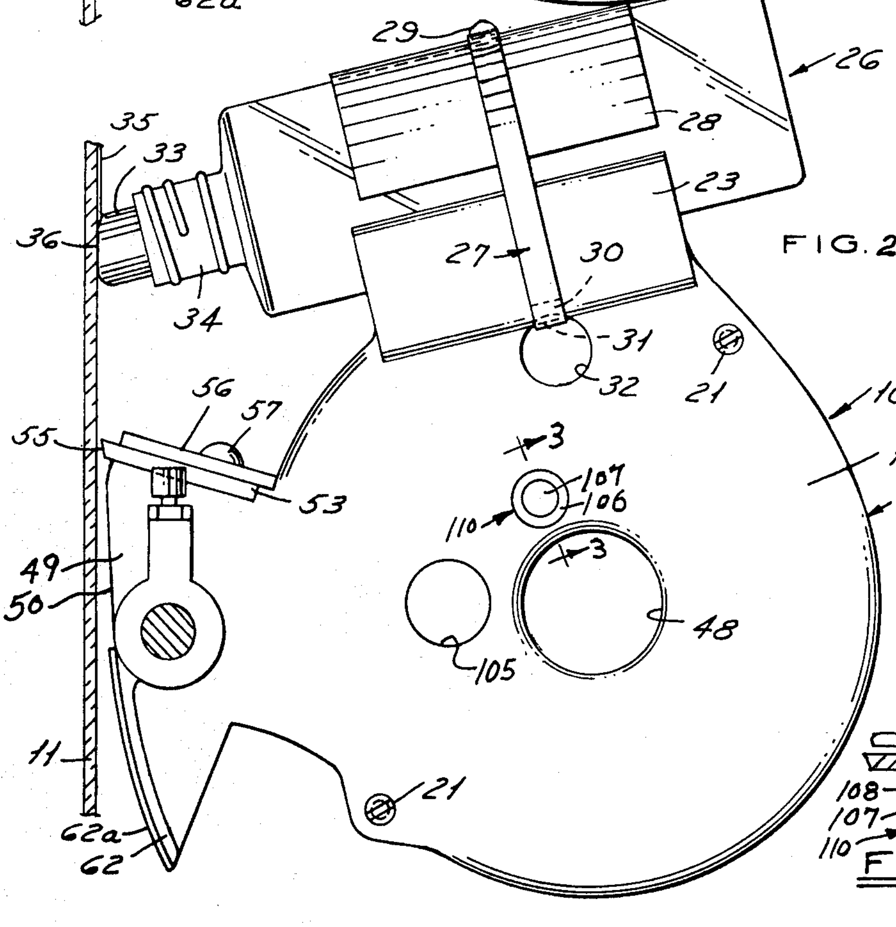
FIG. 2
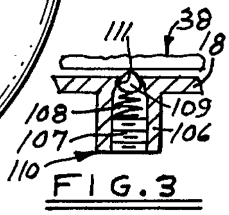
FIG. 3

TAPE DISPENSER AND APPLICATOR

SUMMARY OF THE INVENTION

This application is a continuation-in-part of co-pending U.S. patent application Ser. No. 666,869, filed Mar. 15, 1976, and now U.S. Pat. No. 4,026,757.

This invention relates generally to tape dispensers, and more particularly, to a tape dispenser particularly adapted for use in applying paper lined electrical conductive pressure sensitive adhesive tape on a window pane, door pane and the like, for use as a part of an electrical alarm circuit.

Heretofore, the application of electrically conductive pressure sensitive adhesive tape or foil to windows and other flat surfaces has been made manually. In accordance with the prior art methods of manually applying tape on a flat surface, the installer uses rolled pressure sensitive adhesive tape or foil which has a paper liner. The installer must first lay out lines on the window in accordance with the path which the tape is to follow over the window before he can apply the tape. Such procedure is time consuming. After making the layout of the path which the tape is to follow, in accordance with the prior art manual method, the installer then hangs up a length of unrolled tape on a hook in the ceiling or somewhere near the window, and then the lining paper is peeled off of the tape and the installer then manually applies the tape along the lines previously drawn on the window, without stretching or breaking the tape. If the window is moist and cold, continuous air movement against the window must be provided by some suitable means, as by the use of fans to prevent steaming the window by heat from the hands of the installer. In view of the foregoing, it is an important object of the present invention to provide a novel and improved tape dispenser for applying paper lined electrically conductive pressure sensitive adhesive tape or foil to a window pane or the flat surface, and which overcomes the aforementioned disadvantages of the prior art manual method of applying such tape to a window or other surface.

It is another object of the present invention to provide a novel and improved paper lined tape dispenser which is simple and compact in construction, economical to manufacture, efficient in operation, and applies tape in a minimum of time.

It is still another object of the present invention to provide a novel and improved tape dispenser for applying paper lined electrically conductive pressure sensitive adhesive tape or foil to a window pane, and which is also provided with varnish applying means for applying a strip of varnish to the window pane to cover the tape and make it moisture-proof. The tape dispenser must be used with one hand of an installer while the other hand can be used to operate a small air blower to keep the window free of moisture while applying tape.

It is a further object of the present invention to provide a novel and improved tape dispenser for applying paper lined electrically conductive pressure sensitive adhesive tape on a flat surface, and which includes a housing in which is rotatably mounted a roll of paper lined tape, means for stripping the paper liner from the tape as it is unrolled, and, a pressure means operatively mounted on the housing at a position for applying pressure on the tape as it is discharged from the housing.

Other features and advantages of the invention will be apparent from the following detailed description, appended claims, and the accompanying drawings.

BRIEF DESCRIPTION OF THE DRAWINGS

FIG. 1 is an elevation section view of a tape dispenser made in accordance with the principles of the present invention.

FIG. 2 is an elevation view, partly in section, of the tape dispenser structure illustrated in FIG. 1, and showing a varnish applicator in an operative position.

FIG. 3 is a fragmentary, elevation section view of the tape dispenser structure illustrated in FIG. 2, taken along the line 3—3 thereof, and looking in the direction of the arrows.

DETAILED DESCRIPTION OF THE PREFERRED EMBODIMENT

Referring now to the drawing, and in particular to FIGS. 1 and 2, the numeral 10 generally designates a tape dispenser made in accordance with the principles of the present invention, and showing the tape dispenser applying tape on a window pane 11. The dispenser 10 may be provided with a guide means, as shown in my co-pending U.S. patent application Ser. No. 666,869, now U.S. Pat. No. 4,026,757, and which guide means has not been shown since it does not form any part of the present invention.

In FIG. 1, the tape dispenser 10 is shown in a tape applying position, wherein the tape dispenser 10 is being moved down vertically, and is applying a strip of electrical conductive pressure sensitive adhesive tape or foil, indicated by the numeral 13. The tape 13 may be any suitable electrical conductive pressure sensitive adhesive tape usuable as a part of an electrical alarm system, such as a flexible lead-tin or lead-zinc compound tape. The tape 13 includes a pressure sensitive adhesive backing which is adapted to provide a firm connection to the surface of the window pane 11. The tape is usually about $\frac{3}{8}$ inch wide, and about 0.002 inch thick, although it can be slightly thinner or thicker. As illustrated in FIG. 1, the pressure sensitive tape is wound in a roll with a paper backing strip indicated by the numeral 13a.

As shown in FIGS. 1 and 2, the tape dispenser 10 is provided with a casing or body that includes a right hand portion 14 and a left hand portion 15. The right and left hand body portions 14 and 15, respectively, are substantially circular in plan view. The right hand body portion 14 includes a substantially circular side wall 16 and an integral peripheral wall 17. The left hand body portion 15 includes a substantially circular side wall 18 and an integral peripheral wall, not shown, which mates with the peripheral wall 17 of the left hand body portion 14. As illustrated in FIG. 2, the housing body portions 14 and 15 are secured together by any suitable means, as by a pair of suitable machine screws 21.

As shown in FIGS. 1 and 2, each of the body portions 14 and 15 is provided on the upper end thereof with an integral bottle holder 22 and 23, respectively, each of which is provided on the upper side thereof with a longitudinally extended concave bottle seat, as 24. As shown in FIG. 2, a bottle, generally indicated by the numeral 26, for holding a sealant material, such as varnish or the like, is adapted to be seated in the bottle seats 24. The bottle 26 may be made from any suitable material, such as polyvinyl chloride. The bottle 26 is retained in place on the bottle seats 24 by a suitable flat spring retainer clip, generally indicated by the numeral 27 in FIG. 2. As shown in FIG. 2, the flat spring retainer clip 27 is provided with a halfround retainer pad 28 which is made from any suitable flexible material, such as a plastic material. The retainer pad 28 is secured to the flat spring retainer clip 27 by any suitable means, as by a rivet 29. The ends of the flat spring retainer clip 27 are formed as hooks 30, as shown in FIG. 2. The hooks 30 are each adapted to be snapped in place over a retainer lip 31 formed on the upper end of a hole 32 formed in each of the housing portions 14 and 15.

As shown in FIG. 2, a dauber 33 is mounted in the bottle neck 34 of the bottle 26 for applying a strip of varnish 35 to the window pane 11 after applying the metal foil 13 to seal the same. The dauber 33 may be made from any suitable material, as for example, a foam plastic material. The varnish may be applied in strips 35 on a window pane 11 by bringing a slight pressure to bear on the flexible plastic bottle 26 as the dispenser 10 is moved over the applied tape on the window pane 11. The dauber 33 is preferably formed with a rectangular outer edge 36, whereby it may be turned by rotating the bottle in one direction to a first position to apply the smaller dimension of the dauber to provide a strip of varnish equal to one dimension, as the width of the tape 13. The bottle may be turned to a second position so that the larger dimension of the dauber 33 is applied against the pane 11 so as to provide a wider strip of varnish 35 when covering tape 13 applied on a window pane 11.

As shown in FIG. 1, the housing portions 14 and 15 form a substantially cylindrical tape storage chamber 37 in which is rotatably mounted a roll 38 of paper lined pressure sensitive adhesive electrical conductive tape. The roll of tape 38 is rotatably mounted on a cylindrical hub or short shaft 39 which is integrally formed on the inner side of the body side wall 16. As shown in FIG. 1, an opening 40 is formed through the peripheral housing side walls. The pressure sensitive tape 13, with its paper liner 13*a,* is fed from the roll 38 and toward the opening 40. The tape 13 with its paper liner 13*a* first passes around the lower side of a guide roller 41, after which the paper liner 13*a* is stripped from the tape 13 by a stripper knife 100 which is integrally formed on the inner edge of a wall 101 on the inner side of the side wall 16 of the housing or body 14. Guide roller 41 is mounted on a shaft 43 which is integrally formed on the inner side of the side wall 16 of the housing or body 14. The paper liner 13*a* is separated by the stripper knife 100 and it passes downwardly through an exit passageway 102 formed between the walls 103 and 104 which are also integrally formed on the inner side of the side wall 16 of the housing or body 14. The stripped off paper liner 13*a* then passes out through the discharge opening 105 in a continuous discharging manner. The separated tape 13 continues on its outward movement around a second guide roller 42 which is rotatably mounted on a shaft 44 which is integrally formed on the inner side of an outwardly extended wall extension 45 which is integral with the housing side wall 16. The housing side wall 16 is provided with an elongated radially extended slot 46 which functions as a sight hole to show an operator the amount of tape on the roll of tape 38. The numeral 47 (FIG. 1) comprises a finger hole which extends through the cylindrical tape supporting shaft 39 on the housing wall 16, and which mates with a similar finger hole 48 (FIG. 2) formed through the side wall 18 of the housing portion 15.

As shown in FIG. 2, the housing portion 15 is also provided with a forwardly projecting integral wall extension 49 which has its upper outer end spaced apart laterally from the other housing projecting wall 45 so as to provide an opening 50 through which the tape 13 emerges from the dispenser 10 for application to a window pane 11. The upper side of the opening 50 is enclosed by a wall portion 51 (FIG. 1) which is extended outwardly from the circular housing wall 17 and formed integral therewith. A tape guide roller 52 is rotatably mounted on a shaft 52*a* on the side of the wall 51, adjacent the front end thereof, for guiding the tape 13 as it emerges from the opening 50. A pressure pad 53 is mounted on the upper face 54 of the wall portion 51 and it has a tapered outer end face 55 which bears against the adjacent face of the tape 13 and functions as a means for exerting pressure to the tape 13 to apply it to the window pane 11 as the dispenser 10 is moved over the window pane 11. The pressure member or pad 53 is releasably secured to the wall 51 by a suitable retainer plate 56 and a machine screw 57. The screw 57 is extended through a hole 58 formed through the releasable retainer plate 56 and through an elongated slot 59 formed through the rear end of the pressure pad 53. The lower end of the screw 57 is threadably mounted in a threaded hole 60 formed in the wall portion 51. The elongated slot 59 extends to the rear end of the pressure pad 55 and it is open at that point, so that it is merely necessary to loosen the screw 57 to permit the pressure pad 53 to be slid outwardly and removed for replacement or cleaning purposes. As shown in FIG. 1, a stationary guide pin 61 is fixedly mounted in the housing projecting wall 45, and it extends toward the housing projecting wall 49, whereby the tape 13 passes from the guide roller 42 and through the space between the fixed guide member 61 and the roller 52.

The housing projecting wall 45 has formed on the lower front edge thereof an arcuate guide flange 62 which extends between the housing projecting walls 45 and 49 and encloses the lower end of the opening between said walls, and which has a foam plastic pad 62*a* on the front side thereof. A cylindrical spacer member 63 is integrally formed on the inner face of the housing projecting wall 45, and its free end abuts the inner side of the housing projecting wall 49.

As shown in FIG. 2, a finger hole 105 is formed through the side wall 18 of the housing or body portion 15 to permit the operator to insert a finger therethrough for engaging a fingertip with the side surface of the roll of tape 38, to provide an efficient control over the unrolling movement of the tape 38, as well as to positive stop action.

FIG. 3 illustrates the mounting of a spring biased detent means, generally indicated by the numeral 110, for maintaining a tension on the side of the tape roll 38. A tubular extension 106 is integrally formed on the outer surface of the body side wall 18, and it has threadably mounted therein a suitable set screw 107. A spring 108 is mounted in the tubular extension 106, inside the screw 107. The spring 108 abuts a detent ball 109 which is operatively extended through an opening 111 into engagement with the side surface of the tape roll 38. It will be understood that the tension provided by the detent ball 109 on the side of the tape roll 38 may be adjusted by the setting of the screw 107. A similar detent means, generally indicated by the numeral 110*a,* is mounted on the outer side wall 16 of the other housing or body portion 14.

In use, the operator starts the tape 13 at a suitable starting mark at the upper end of the window pane 11, and then moves the dispenser 10 downwardly, while at the same time pressing the tape 13 against the window pane by means of the pressure pad 53, which has a 45° taper or angle pressure face 55. The arcuate guide flange 62 may be employed in the same manner as described in the aforecited co-pending application for applying tape in courses having right angled turns. It will be seen that the paper liner 13*a* is continuously ejected through the discharge opening 105 as the tape 13 is continually applied to a window pane surface. It will also be seen that the tension on the side of the tape roll 38 may be adjusted by means of the detent means 110 and 110*a*. Also, the operator may apply a manual control on the side of the tape roll 38 by applying a fingertip through the opening 105.

While it will be apparent that the preferred embodiment of the invention herein disclosed is well calculated to fulfill the objects above stated, it will be appreciated that the invention is susceptible to modification, variation and change.

What is claimed is:

1. In a tape dispenser for applying pressure sensitive adhesive tape on a flat surface, the combination comprising:

(a) a housing having a tape storage chamber, including a tape roll supporting means for rotatably supporting a roll of paper lined pressure sensitive adhesive tape in said chamber;

(b) a roll of pressure sensitive adhesive having a paper liner covering the adhesive tape rotatably mounted on said tape roll supporting means;

(c) said housing having an outward extension on one side thereof through which is formed a tape dispensing path, and which extension has on its outer face a tape discharge opening for discharging the tape from the housing and applying it to a flat surface;

(d) a pressure means operatively carried on said housing extension in a position over said opening for pressing said tape on a flat surface as it is discharged from the housing extension opening;

(e) a V-shaped stripper means mounted in said housing for engagement with the paper liner on the tape for stripping the paper liner from the tape as it is unrolled and discharged from the dispenser housing;

(f) discharge passage means between said housing and said outward extension for discharging from the housing the paper liner stripped from the tape;

(g) said pressure means comprising an elongated pressure pad mounted radially to the axis of rotation of a roll of tape on said tape roll supporting means, and having a tapered outer end face which bears against the adjacent face of the tape discharged from the housing through the tape discharge opening for exerting pressure on the tape to apply it to a flat surface as the tape dispenser is pulled over said flat surface; and, (h) a guide roller operatively mounted on said outward extension adjacent said pressure pad for guiding the tape under the pressure pad as the tape emerges from the tape discharge opening in the housing.

2. A tape dispenser as defined in claim 1, including:

(a) guide roller means disposed inside said housing for guiding the paper lined tape into engagement with said stripper means.

3. A tape dispenser as defined in claim 2, including:

(a) an adjustable tension means on said housing engageable with the side of the roll of tape in the housing.

4. A tape dispenser as defined in claim 3, wherein:

(a) said adjustable tension means comprises a detent means.

5. A tape dispenser as defined in claim 4, wherein:

(a) said housing is provided in a side wall with a finger hole for admission of a finger tip for engagement with the side of the roll of tape for manual braking of the unrolling action of the roll of tape in the housing.

* * * * *